Figure 1:
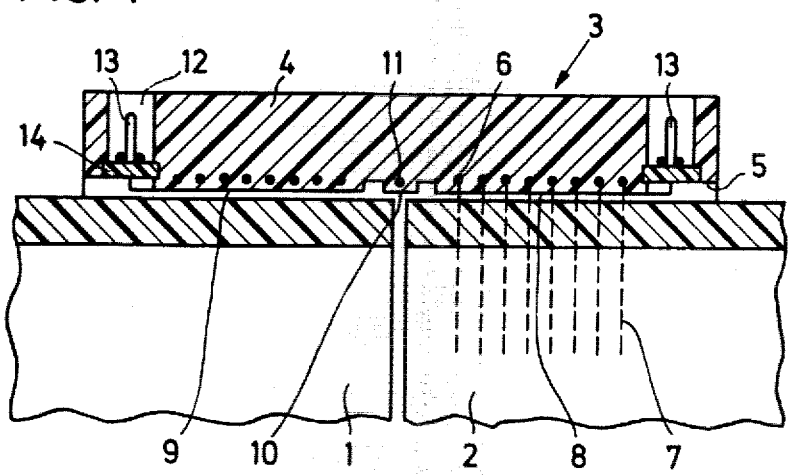

United States Patent

Sturm

[11] 4,313,053
[45] Jan. 26, 1982

[54] WELDING SLEEVE OF THERMOPLASTIC MATERIAL

[75] Inventor: Werner Sturm, Hägendorf, Switzerland

[73] Assignee: Von Roll A.G., Switzerland; a part interest

[21] Appl. No.: 193,406

[22] Filed: Jan. 2, 1980

[51] Int. Cl.³ .............................................. H05B 3/58
[52] U.S. Cl. ............................ 219/544; 156/272; 156/380.9; 219/535; 264/272.19; 285/21
[58] Field of Search ............... 219/534, 535, 541, 544; 174/76; 156/272, 275, 293, 380; 285/21, 22, 149, 288, 369, 417, 422, DIG. 20; 264/27, 272, 275, 332; 425/143, 144, 174.6

[56] References Cited

U.S. PATENT DOCUMENTS

| | | | |
|---|---|---|---|
| 2,223,434 | 12/1940 | Trickey | 285/288 |
| 3,094,452 | 6/1963 | von Riegen et al. | 285/21 X |
| 3,422,179 | 1/1969 | Bauer et al. | 264/272 |
| 3,943,334 | 3/1976 | Sturm | 219/544 |
| 3,954,541 | 5/1976 | Landgraf | 156/275 |
| 4,117,311 | 9/1978 | Sturm | 219/544 |
| 4,147,926 | 4/1979 | Stähli | 219/535 |
| 4,176,274 | 11/1979 | Lippera | 219/544 X |
| 4,224,505 | 9/1980 | Sturm | 219/544 |

Primary Examiner—Volodymyr Y. Mayewsky
Attorney, Agent, or Firm—Roylance, Abrams, Berdo & Farley

[57] ABSTRACT

A sleeve member (4) formed from a pipe length by expansion is placed over a mandrel onto which are wound the spaced turns (7) of a resistance heating wire (6). By heating sleeve member (4) the latter is shrunk onto the turns (7). By electrically producing heat in wire (6) material flows around the expanding turns (7) and embed the latter completely in sleeve member (4), projecting material portions (8, 9) being formed in the vicinity of turns (7). Thus, a protection against electric shock hazard is obtained for turns (7) and after-working is made unnecessary for the standing back edge portions of inner wall (5) which deform inwards during manufacture.

7 Claims, 3 Drawing Figures

WELDING SLEEVE OF THERMOPLASTIC MATERIAL

The invention relates to an welding sleeve made from thermoplastic material for joining thermoplastic line members with a shell-like sleeve member formed from a pipe length on whose inner wall are arranged the turns of an electrical resistance heating wire, and a method for the manufacture of the welded sleeve.

It is known to use shell-like, thermoplastic sleeves with a cylindrical sleeve member in whose inner wall is embedded an electrical resistance heating wire in shaped juxtaposed turns for joining thermoplastic line elements, i.e. pipe lengths, shaped parts and control members, e.g. valves. Due to the heat produced electrically in the resistance heating wire the thermoplastic material of the welding sleeve and the ends of the line elements covered by the welding sleeve are caused to flow at the adjacent surface portions and are welded together. In this way, it is possible to produce dripproof and pressure-tight joints in a simple manner.

The manufacture of such welding sleeves appears to be relatively simple, particularly in the case of the most frequently encountered line diameters of up to about 100 mm. Welding sleeves for such sizes are more particularly produced by injection moulding of the sleeve member, in which the resistance heating wire is embedded in different ways in the sleeve member. It is relatively simple to injection mould round a carrier sleeve onto which is wound the resistance heating wire. However, it is also possible to provide a helical slot on the inner wall of the sleeve member and to embed the resistance heating wire therein, the latter optionally being covered to provide protection against electric shock hazard.

However, if larger sleeve diameters are required account must be taken of various problems. As only smaller quantities of such larger welding sleeves are required, it is advantageous to be able to obviate the use of an expensive injection mould of the type advantageously used for injection moulding of standard sleeve sizes, whereby the sleeve instead is made from a pipe length. The problem is then to arrange the resistance heating wire in suitable manner in the form of turns in the vicinity of the inner wall of the pipe length. As there are also connections for connecting the resistance heating wire with a power supply, a relatively large amount of manual labour is involved in the case of welding sleeves made from pipe lengths. If one of the known methods is used in which the resistance heating wire is placed in a helical slot made in the inner wall the manufacture of said slot constitutes an additional operation. A further additional operation is necessary if protection against electric shock hazard is also required.

The problem of the present invention is to so develop an welding sleeve of the type described hereinbefore that it is possible to insert and connect the resistance wire to the sleeve member without additional processing operations and whilst simultaneously achieving a suitable protection against electric shock hazard.

According to the invention, this problem is solved in that in the area of the resistance heating wire turns serving to produce the connection with the line elements, a material portion is provided which covers the turns and projects with respect to the inner wall of the pipe length. As a result, the turns of the resistance heating wire are located in the vicinity of the inner wall of the sleeve member, whilst also providing an adequate protection against electric shock hazard.

The invention also relates to a method for the manufacture of the welding sleeve according to the invention with the following method steps:

expanding a pipe length;

winding the resistance heating wire onto a mandrel whose external diameter is smaller than the internal diameter of the widened pipe length, reduced by at least double the thickness of the resistance heating wire;

placing the pipe length on the mandrel;

shrinking the pipe length onto the mandrel in a zone at elevated temperature;

electrical heat production in the resistance heating wire until the material flows and penetrates the turns thereof; and cooling the pipe length on the winding mandrel and ejection therefrom.

The invention is explained in greater detail hereinafter relative to a non-limitative embodiment and with reference to the drawings, wherein show:

FIG. 1 a vertical section through a partly represented welding sleeve and two ends of line elements.

Figure 2:
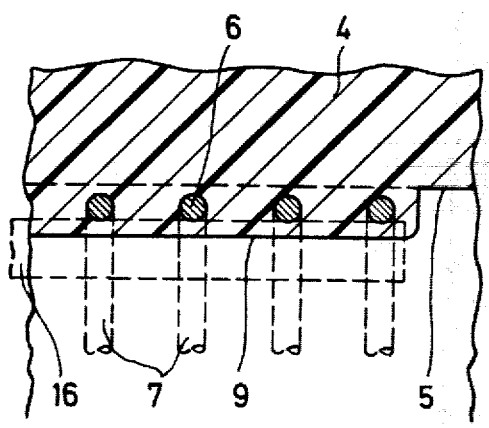

FIG. 2 a detail of the welding sleeve of FIG. 1.

Figure 3:
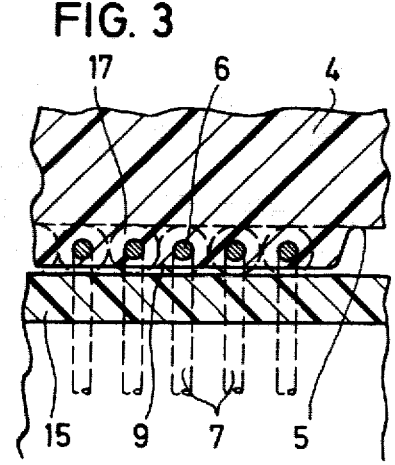

FIG. 3 a variant of the detail of the welding sleeve of FIG. 1.

The joining of the ends of two line elements 1, 2, e.g. pipe lengths shown in FIG. 1 is effected by means of an arc welded sleeve 3 which extends halfway over each of the ends of the line elements 1, 2. The arc welded sleeve 3 has a sleeve member 4 formed from a thermoplastic material and which is e.g. a pipe length separated from a pipe having a constant wall thickness. An electrical resistance heating wire 6 laid in diagrammatically represented spaced turns 7 is embedded in the inner wall 5 of sleeve member 4. The turns 7 are laid in two separate areas distinguished by a material portion 8, 9 covering turns 7 and projecting with respect to inner wall 5. FIG. 1 shows that the projecting material portions 8, 9 do not extend up to the edge of the sleeve member 4 and instead only extend over the region of turns 7. A further, narrow material portion 10 is provided between the two material portions 8, 9 and in which is provided a connecting wire 11 for connecting the turns 7 of the two material portions 8, 9.

A bore 12 is provided on each of the two ends of sleeve member 4 for receiving a contact stud 13 fixed in a supporting plate 14. The supporting plate 14 is supported in the bottom of bore 12 and covers the connection of the resistance heating wires 6 to contact stud 13. A not shown bush can be placed on contact studs 13, thereby producing the connection to the power supply for making a welded joint.

FIG. 1 shows that the inner wall 5 of sleeve member 4 stands back at the edges. When making the sleeve from a pipe length it is unavoidable that the ends will be somewhat inwardly deformed. As a result of the projecting material portions 8, 9 the otherwise necessary after-working of inner wall 5 along the edge portions is eliminated.

The manufacture of the arc welded sleeve 3 according to FIG. 1 is described by means of FIGS. 2 and 3. In the simplest embodiment (FIG. 3) the resistance heating wire 6 with a predetermined spacing of turns 7 is wound onto a winding mandrel 15 made for example from a plastics material, e.g. PTFE. The sleeve member 4 prepared from a pipe length is widened until it can be placed over the winding mandrel 15 with the wound resistance heating wire 6. Sleeve member 4 is now shrunk on the winding mandrel 15 in a heating furnace and rests on the turns 7. The resistance heating wire 6 is now connected to a power supply and heat is produced in turns 7 which makes the inner wall 5 flow. Sleeve member 4 now shrinks further until it engages on the winding mandrel 15 whilst simultaneously the wire 6 expands so that it completely surrounds the material of sleeve member 4. The resistance heating wire 6 displaces the material forming the projecting material portion 8 or 9 having a thickness of at least approximately 0.1 mm which is sufficient to obviate after-working on the edge portions of inner wall 5. After cooling, the winding mandrel 15 is ejected and the arc welded sleeve is ready for use.

If thicker material portions 8, 9 are required, the resistance heating wire 6 can be wound onto a plastic casing 16 as shown by dotted lines in FIG. 2. The shrinkage of sleeve member 4 takes place in the manner described hereinbefore. The final state is shown in FIG. 2. The plastic casing 16 is joined completely to sleeve member 4 and forms one of the projecting material portions 8, 9 in which are embedded the turns 7. The material thickness over turn 7 can be 0.5 mm or more. The plastic casing 16 with the wound resistance heating wire 6 can optionally be placed on a supporting mandrel if casing 16 cannot in itself form the winding mandrel.

The plastic casing 16 can be replaced by a plastic-encased resistance heating wire 6 wound onto the winding mandrel 15, cf FIG. 3. The covering 17 then forms the projecting material portion instead of the plastic casing 16 of FIG. 2. The shrinkage of sleeve member 4 takes place in the same way.

It is also possible to expand the winding mandrel 15 after winding on the resistance heating wire 6, e.g. by producing an internal pressure within the winding mandrel 15. The sleeve member 4 is shrunk in the manner described hereinbefore, but during the production of heat in turns 17, the expansion is slowly cancelled out, so that the material can continue to flow and form a thicker material portion 8, 9. If the same or a similar material as used for sleeve member 4 is used for the plastic casing 16 (FIG. 2) and for the covering 17 (FIG. 3) a uniform cohesive body is formed in which turns 7 are embedded in a completely covered manner. As a result of the above-described method, manual after-working is essentially limited to the connecting of the resistance heating wire to the contact stud 13.

I claim:

1. An electric welding muff for joining thermoplastic line elements, comprising
    a welding sleeve formed of a length of thermoplastic pipe having opposite axial ends and having an inner wall with an annular projection extending inwardly therefrom, said annular projection being spaced axially from said axial ends of said sleeve such that said sleeve has a greater internal diameter adjacent said axial ends than along said annular projection; and
    an electrical resistance heating wire arranged in a plurality of turns, said turns being entirely embedded in said annular projection.

2. An electric welding muff according to claim 1, wherein said projection is formed from thermoplastic material applied to said sleeve inner wall with said heating wire turns.

3. An electric welding muff according to claim 2, wherein said projection extends at least 0.1 mm. from said inner wall.

4. An electric welding muff according to claim 1, wherein said projection is formed as a unitary portion of said length of thermoplastic pipe.

5. An electric welding muff according to claim 4, wherein said projection extends at least 0.1 mm. from said inner wall.

6. An electric welding muff according to claim 1, wherein said projection extends at least 0.1 mm. from said inner wall.

7. An electric welding muff according to claim 1, wherein said heating wire turns are covered by a 0.5 mm. thickness of thermoplastic material.

* * * * *